(12) United States Patent
Kontani (10) Patent No.: US 8,035,744 B2
(45) Date of Patent: Oct. 11, 2011

(54) TELEVISION RECEIVER AND METHOD OF RECEIVING TELEVISION BROADCASTING

(75) Inventor: Takuya Kontani, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/839,053

(22) Filed: Jul. 19, 2010

(65) Prior Publication Data

US 2011/0075030 A1      Mar. 31, 2011

(30) Foreign Application Priority Data

Sep. 28, 2009   (JP) .................................. 2009-221981

(51) Int. Cl.
*H04N 5/60* (2006.01)
*H04N 5/445* (2006.01)
(52) U.S. Cl. .......................... 348/553; 348/725; 348/563
(58) Field of Classification Search .................. 348/563, 348/564, 569, 589, 725, 553, 578, 580, 511, 348/515; 725/43; 434/169, 185, 307 R, 434/156, 157, 308, 365; 704/3; *H04N 5/445, H04N 5/44, 5/60, 9/74*
See application file for complete search history.

(56) References Cited

U.S. PATENT DOCUMENTS 5,938,447 A * 8/1999 Kirksey ........................ 348/589

FOREIGN PATENT DOCUMENTS

| JP | 5-019188 | 3/1993 |
| JP | 5-324702 | 12/1993 |
| JP | 2000-322077 | 11/2000 |
| JP | 2005-341072 | 12/2005 |
| JP | 2009-175803 | 8/2009 |

OTHER PUBLICATIONS

Japanese Patent Application No. 2009-221981; Notification of Reason for Refusal; Mailed Oct. 5, 2010 (English Translation).
Japanese Patent Application No. 2009-221981; Notification of Reason for Refusal; Mailed Jan. 11, 2011 (English Translation).

* cited by examiner

*Primary Examiner* — Sherrie Hsia
(74) *Attorney, Agent, or Firm* — Blakely, Sokoloff, Taylor & Zafman LLP (57) ABSTRACT

A television receiver includes: an audio processor configured to extract a demonstrative pronoun from an input voice; an image processor configured to cut out an object from an input image; and a comparison-translation module configured to associate the demonstrative pronoun with the object based on a positional relationship indicated by the demonstrative pronoun.

9 Claims, 14 Drawing Sheets

FIG. 7
EXAMPLE (1 SCREEN REGION DIVISION)

(1) SEPARATION OF DISTANT VIEW AND NEAR VIEW
 (FOR EXAMPLE, ALGORITHM FOR OBTAINING HIGH-QUALITY IMAGE)
(2) OBJECT SEPARATION (FOR EXAMPLE, EDGE DETECTION ALGORITHM)
(3) OBJECT NEIGHBORHOOD SETTING
 (FOR EXAMPLE, SET n PIXELS FROM EDGE IN CONSIDERATION OF PERSPECTIVE.
 NEIGHBORHOOD IS ALSO MOVED WITH MOVEMENT OF OBJ)

FIG. 8

EXAMPLE (2 DETERMINATION OF TYPE OF OBJECT)

(1) I (SPEAKER): PERSON; FOR EXAMPLE, MOUTH IS MOVED AT THE BEGINNING AND SOUND IS OUTPUT WHEN ONE PERSON IS VIEWED

(2) YOU (PERSON WHO LISTENS AND REPLIES): PERSON WHO IS OTHER THAN 'I', FACES 'I', AND REACTS WITH MOTION OF 'I'

(3) THIRD PARTY (HE OR SHE): PERSON OTHER THAN 'I' AND 'YOU' (WHICH IS THE SAME AS OBJECT AND IS INDICATED BY SPECIAL REFERENCE TERM, SUCH AS THAT PERSON OR THIS PERSON)

(4) NARRATOR (IMPERSONAL): VIRTUAL OBJ (NEIGHBORHOOD IS NEAR VIEW) SET WHEN PERSON IS NOT VIEWED, BUT ONLY SOUND IS OUTPUT (5) OBJECT: OBJECTS AND ANIMALS OTHER THAN PERSONS

FIG. 9

EXAMPLE (3 EXTRACTION OF DEMONSTRATIVE PRONOUN AND MOVEMENT VERB)

- PRONOUN
  - PERSONAL PRONOUN (I, YOU, AND HE)
  - POSSESSIVE PRONOUN (MINE AND YOURS)
  - DEMONSTRATIVE PRONOUN (THIS, THAT, AND IT)
  - INTERROGATIVE PRONOUN (WHAT AND WHICH)
  - REFLEXIVE PRONOUN (MYSELF)
- VERB INDICATING MOVEMENT
  - ○: 'GO', 'COME', 'MEET', 'THROW', AND 'DRAW'
  - (×: 'STAY', 'BLOOM', 'SMILE', 'BREAK', AND 'EAT').
- PRONOUN IS EXTRACTED FROM VOICE WHILE FOCUSING ATTENTION TO DEMONSTRATIVE PRONOUN AND MOVEMENT VERB (VOICE RECOGNITION AND MORPHEME/SENTENCE ANALYSIS)
- PROCESS LOAD IS SMALL SINCE THERE ARE DEMONSTRATIVE PRONOUNS AND MOVEMENT VERBS IN ANY LANGUAGE AND THE NUMBER OF DEMONSTRATIVE PRONOUNS AND MOVEMENT VERBS USED FREQUENTLY IS NOT LARGE
- IN MANY CASES, KEY WORD OF CONVERSATION IS INDICATED BY DEMONSTRATIVE PRONOUN

FIG. 10

EXAMPLE (4 NARROWING OF RANGE OF OBJ BASED ON POSITIONAL RELATIONSHIP WHEN PRONOUN APPEARS

FIG. 12

EXAMPLE (6 DETERMINATION OF OBJ FROM MOVEMENT VERB)

DIRECTIONAL CHARACTERISTICS OF
MOVEMENT VERB 'PICK': SUBJECT → OBJECT

I'LL PICK IT UP

MOTION VECTOR
OF OBJ (YOU←)

= THIS = PRESENT

· REGISTERED DATA FORMAT (DIRECTIONAL CHARACTERISTICS OF MOVEMENT VERB):
(VERB, VALENCE, CHARACTERISTICS)
(PICK, 2, S → 0) # SUBJECT IS CLOSE TO OBJECT
(GIVE, 3, Od:S →, Od → Oi) # DIRECT OBJECT IS AWAY
FROM SUBJECT AND IS CLOSE TO INDIRECT OBJECT

FIG. 13

EXAMPLE (7 DETERMINATION OF TRANSLATED WORD FROM MOVEMENT/
IMAGE CHARACTERISTIC-ADDED DICTIONARY AND DISPLAY OF IT)

FIG. 14

DESCRIPTION OF APPLICATION OF PROBABILISTIC METHOD:

(EXAMPLE)
MEASUREMENT OF APPROXIMATION IN CONSIDERATION OF AMBIGUITY
(FOR EXAMPLE, INVERSE NUMBER OF REAPPROACH DISTANCE)
OBJ (A) I ← 30, YOU ← 19
OBJ (B) I ← 15, YOU ← 40

MAXIMUM LIKELIHOOD METHOD,
P (THAT = X | I ← THAT & YOU ← THAT)
MAXIMUM CONDITIONAL PROBABILITY IS OBTAINED AT THE FOLLOWING VALUE 30 x 19 = 570,
15 x 40 = 600, → THAT = OBJ (B)

TELEVISION RECEIVER AND METHOD OF RECEIVING TELEVISION BROADCASTING

CROSS-REFERENCE TO THE RELATED APPLICATION(S)

The present application is based upon and claims priority from prior Japanese Patent Application No. 2009-221981, filed on Sep. 28, 2009, the entire contents of which are incorporated herein by reference.

BACKGROUND

1. Field

The present invention relates to a television receiver and a method of receiving television broadcasting having an automatic translation and display feature.

2. Description of the Related Art

A technique for providing an automatic translation and display in a television receiver has drawn attention. As an application, any scene button is pushed to display a phrase of each scene on a display, and a Japanese-to-English conversion button is pushed to convert a Japanese phrase to an English phrase and display it. In addition, when an audio output button is pushed, the phrase is pronounced in English. When a keyword button is pushed, a corresponding phrase is searched using level information added to the phrase. A publication JP-A-5-324702 discloses a configuration that translates a voice phrase and displays the translated words on a video scene.

However, in the proposed configuration, information extracted from a video is not used for translation, but the technique simply relates to a display method. Therefore, JP-A-5-324702 does not disclose a technique capable of improving the accuracy of translation using image information.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

DETAILED DESCRIPTION

An embodiment according to the present invention will be described in detail with reference to the accompanying drawings. The scope of the claimed invention should not be limited to the examples illustrated in the drawings and those described below.

First Embodiment

A first embodiment of the invention will be described with reference to FIGS. 1 to 14.

Figure 1:
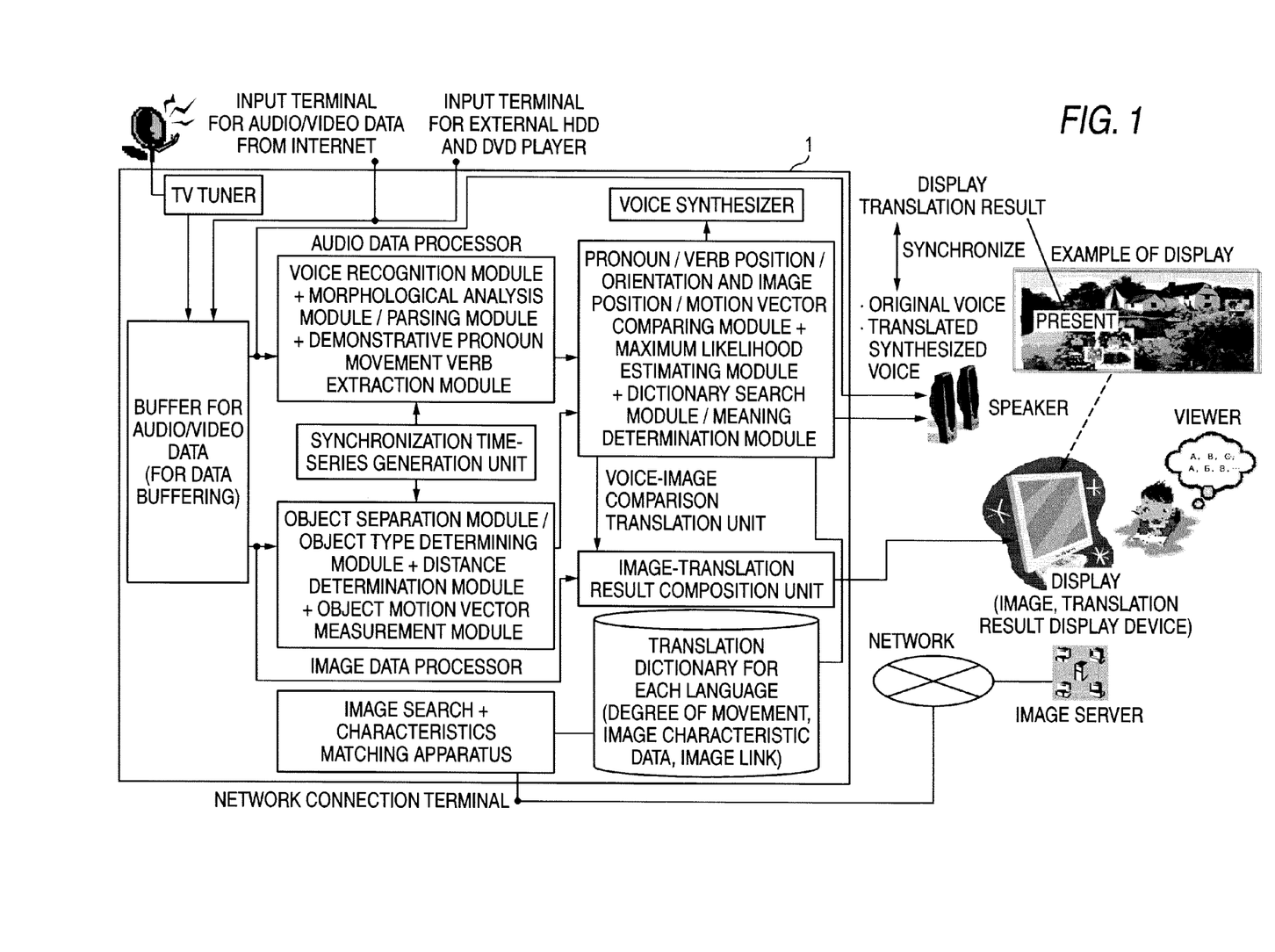
FIG. 1 is a conceptual diagram illustrating a system according to an embodiment of the invention.

FIG. 1 is a conceptual diagram illustrating a system according to an embodiment of the invention and includes a block diagram illustrating a configuration of a television receiver 1. Components of the television receiver 1 will be described later.

Figure 2:
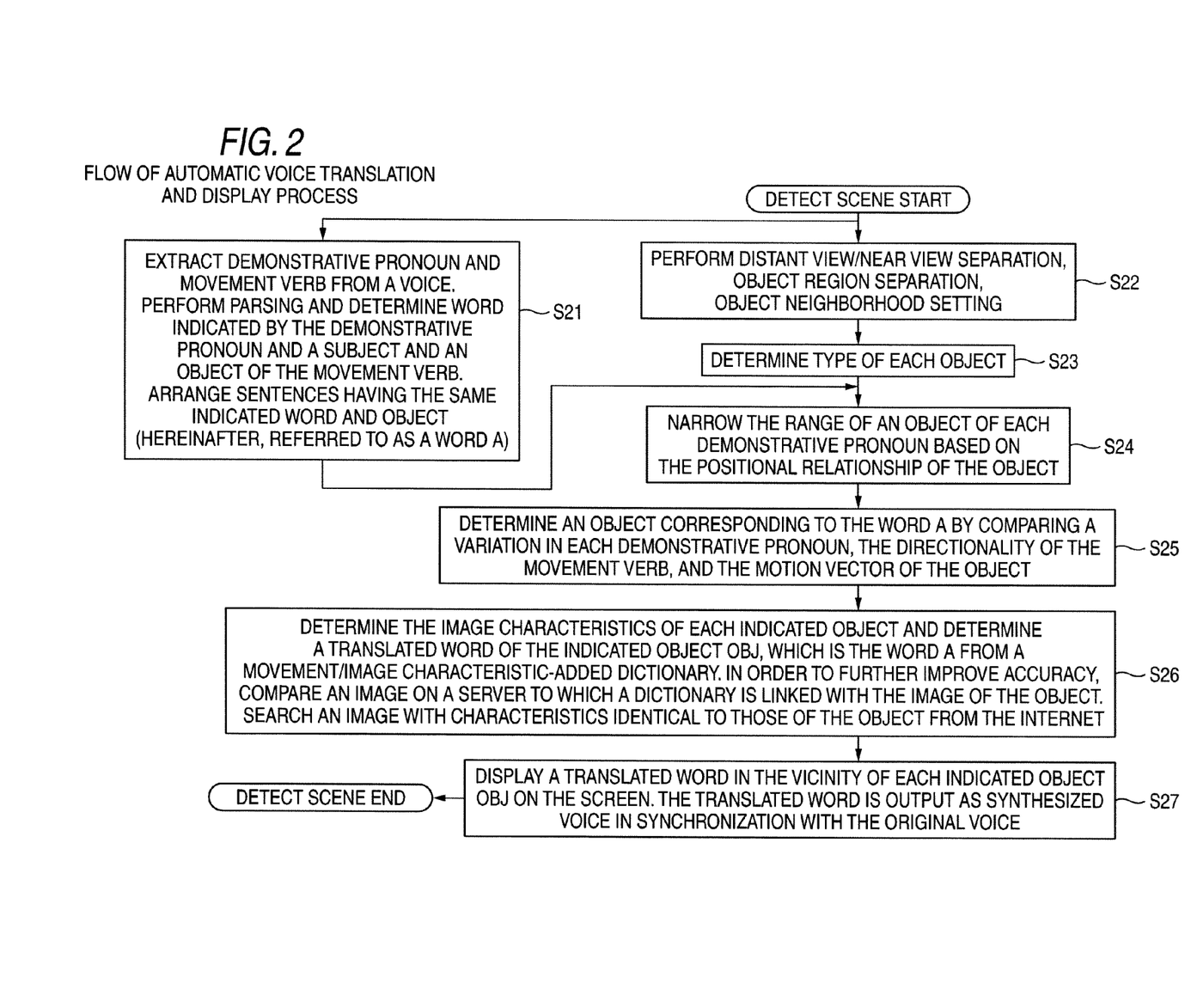
FIG. 2 is a flowchart illustrating an automatic voice translation and display process according to the embodiment.

FIG. 2 is a flowchart illustrating an automatic voice translation and display process according to the invention. FIG. 2 shows a process related to the detection of a scene from an image displayed on a television.

Step S21: a demonstrative pronoun and a movement verb are extracted from a voice. Then, parsing is performed to determine a word indicated by the demonstrative pronoun and a subject and an object of the movement verb. In addition, sentences having the same indicated word and object (hereinafter, referred to as a word A) are arranged.

Step S22: Distant view/near view separation, object region separation, object neighborhood setting are performed.

Step S23: The type of each object (OBJ) is determined.

Step S24: The range of an object of each demonstrative pronoun is narrowed based on the positional relationship of the object (OBJ) when the demonstrative pronoun appears, using the results of Step S21 and Step S23.

Step S25: A variation in each demonstrative pronoun, the directionality of the movement verb, and the motion vector of the OBJ are compared with each other to determine an OBJ corresponding to the word A.

Step S26: The image characteristics of each indicated object OBJ are determined and a translated word of the indicated object OBJ, that is, the word A is determined from a movement/image characteristic-added dictionary. In order to further improve accuracy, an image on a server to which a dictionary is linked is compared with the image of the object OBJ. In addition, an image with characteristics identical to those of the object OBJ is searched from the Internet.

Step S27: A translated word is displayed in the vicinity of each indicated object OBJ on the screen. The translated word is output as a synthesized voice in synchronization with the original voice.

Figure 3:
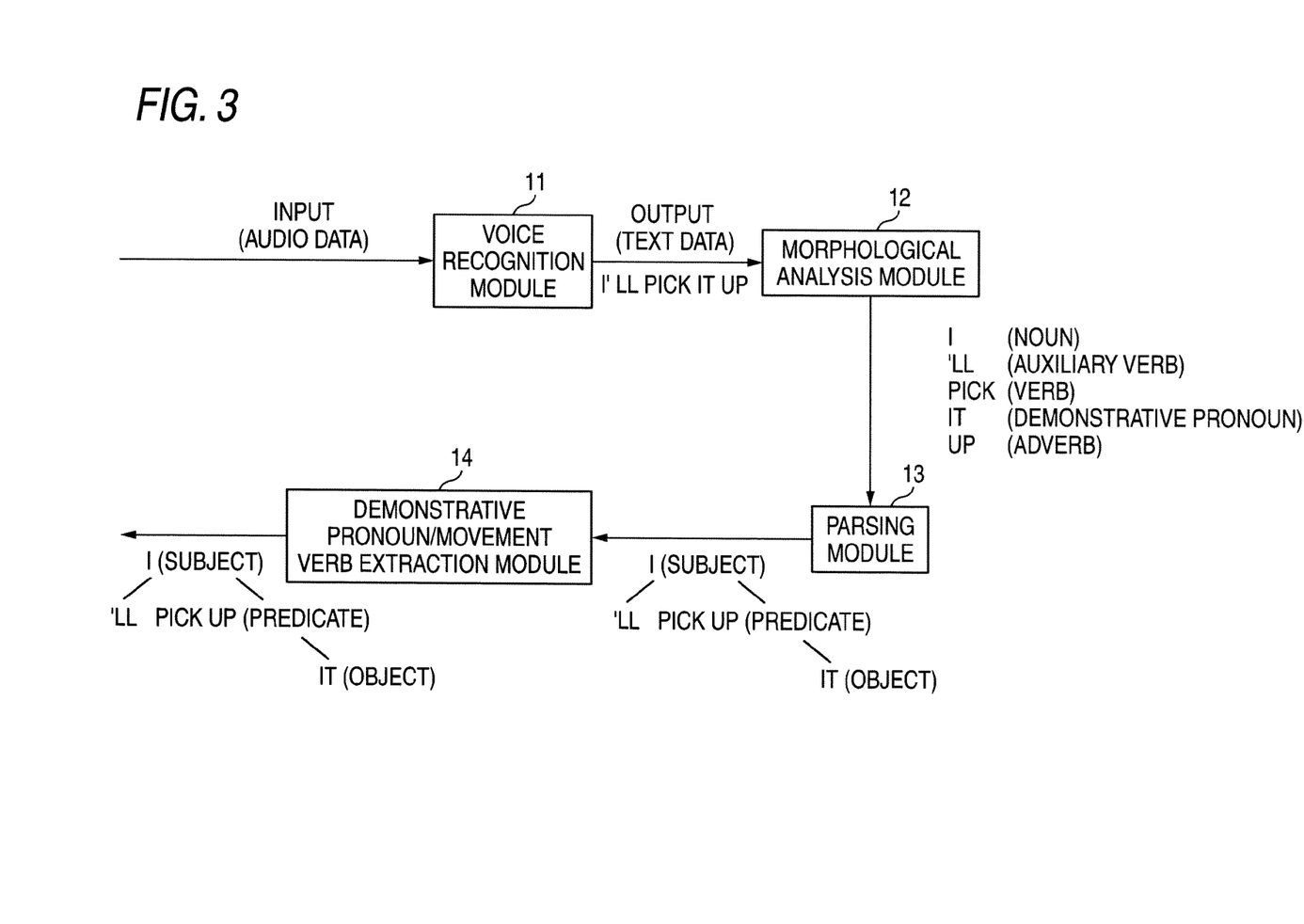
FIG. 3 is a conceptual diagram illustrating an audio data processing device according to the embodiment.

FIG. 3 is a conceptual diagram illustrating an audio data processing device according to the embodiment.

First, input audio data is output as text data by a voice recognition module 11. In this embodiment, the text data is "I'll pick it up."

Then, a morphological analysis module 12 determines that "I" is a noun, "'ll" is an auxiliary verb, "pick" is a verb, "it" is a demonstrative pronoun, and "up" is an adverb. Then, as shown in FIG. 3, a parsing module 13 analyzes the sentence and determines that "I" is a subject, "'ll+pick" is a predicate, and "it" is an object. As shown in FIG. 3, a demonstrative pronoun/movement verb extraction module 14 extracts "pick" as a movement verb and "it" as a demonstrative pronoun, based on the analysis result.

Figure 4:
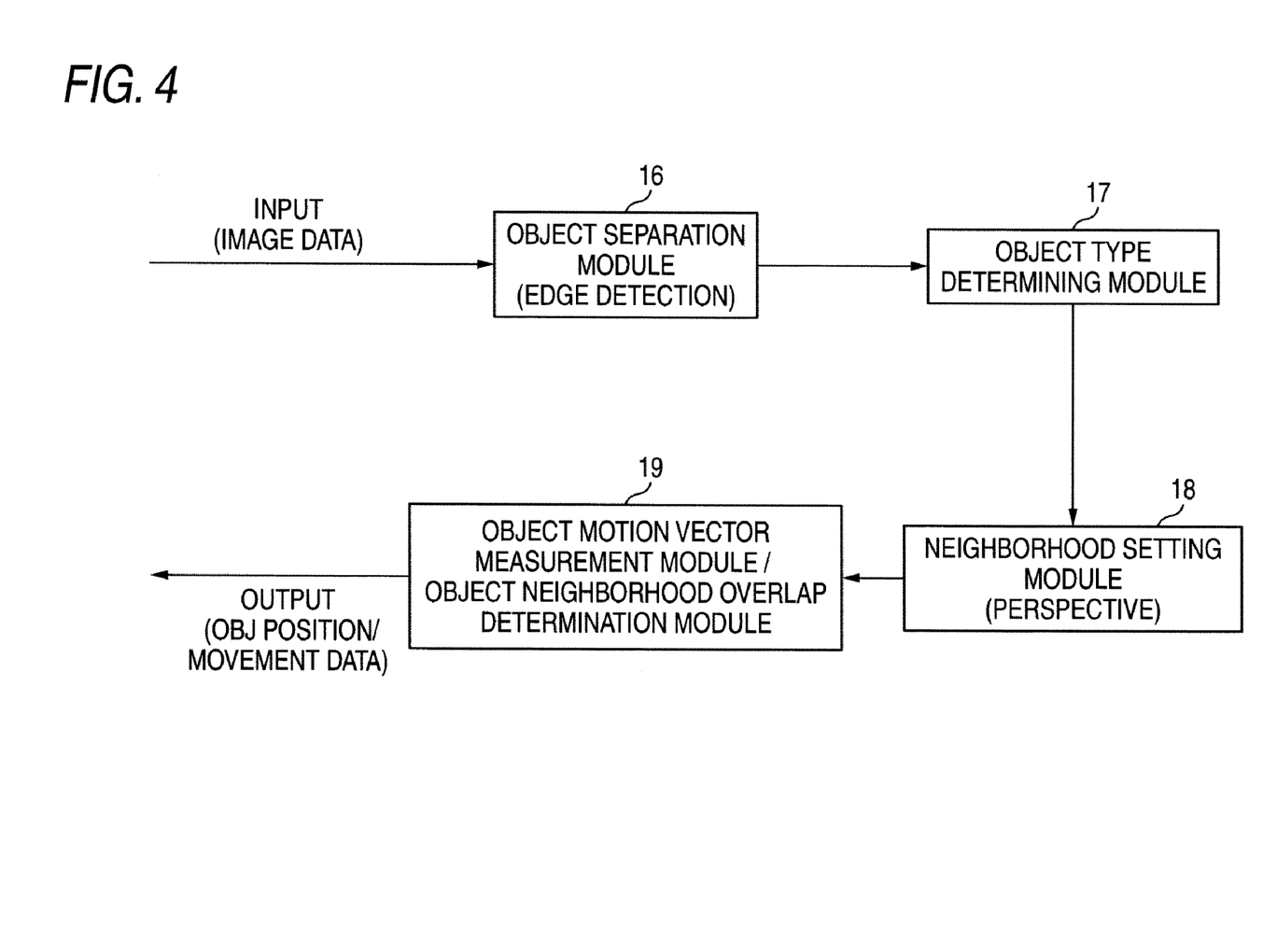
FIG. 4 is a conceptual diagram illustrating an image data processing device according to the embodiment.

FIG. 4 is a conceptual diagram illustrating an image data processing device according to the embodiment.

First, an object separation module 16 (edge detection) outputs input image data as object separation data.

Then, an object type determining module 17 determines the type of object. Then, a neighborhood setting module 18 (perspective) adds neighborhood to each object. In other words, the neighborhood setting module 18 sets neighborhood area that defines a neighborhood of each object. Then, a module 19 (an object motion vector measurement module/object neighborhood overlap determination module) outputs OBJ position/motion data based on the result.

Figure 5:
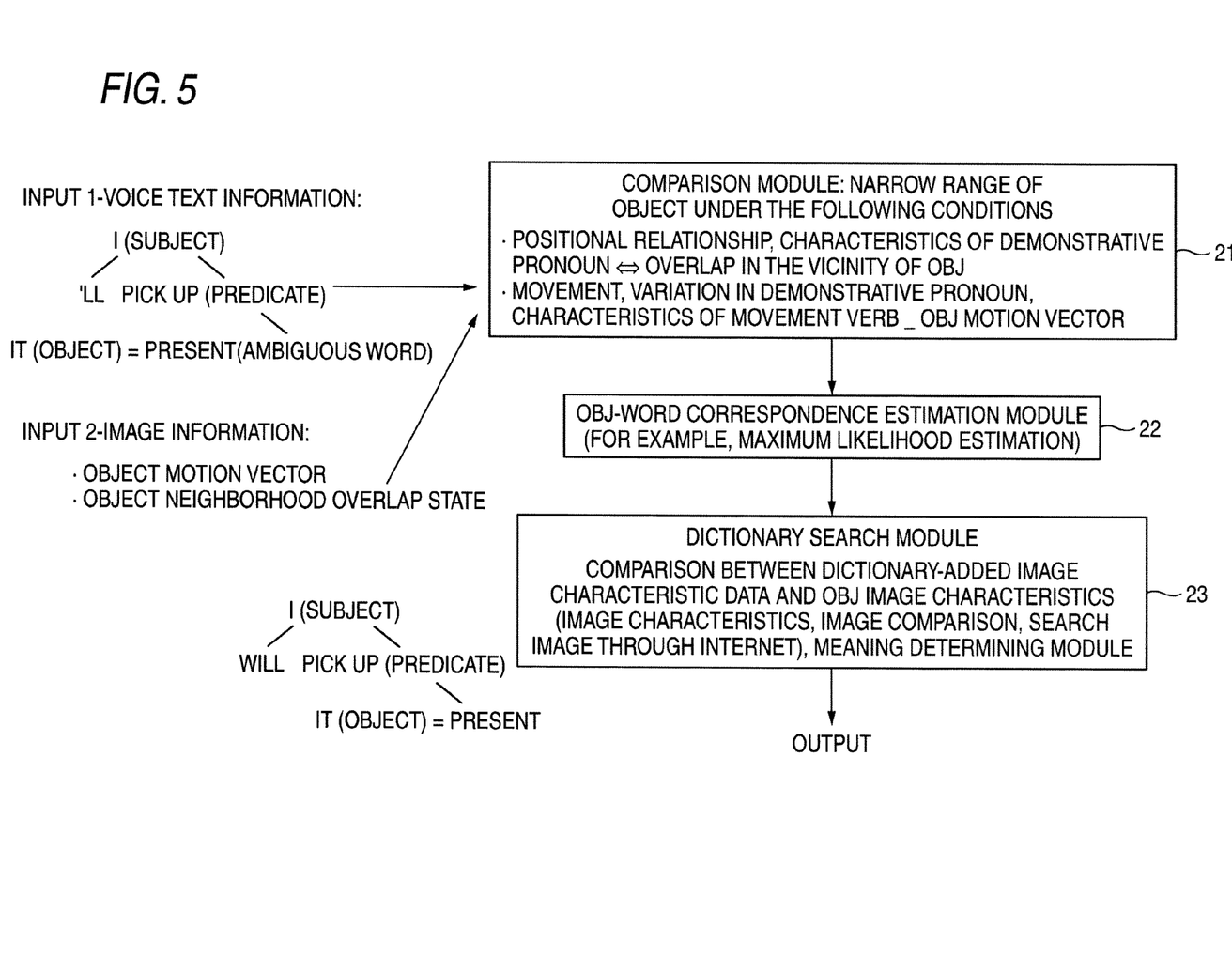
FIG. 5 is a conceptual diagram illustrating a comparison-translation module according to the embodiment.

FIG. 5 is a conceptual diagram illustrating a comparison-translation module according to the embodiment.

First, a comparison unit 21 narrows the range of an object based on input voice text information and image information. In FIG. 3, "it" (object) is associated with an ambiguous word "present" and an object motion vector and the OBJ neighborhood overlap state of the image information are considered. The comparison unit narrows the range of the object based on the positional relationship between the characteristics of the demonstrative pronoun and the OBJ neighborhood overlap, a variation in the demonstrative pronoun, and the movement of the characteristics of the movement verb and the OBJ motion vector.

Then, an OBJ-word correspondence estimation module 22 estimates OBJ-word correspondence using, for example, a maximum likelihood estimating method. Then, a dictionary search module 23 compares dictionary-added image characteristic data with OBJ image characteristics (using image characteristics, image comparison, and Internet image search) to obtain an object "present" as an output of a meaning determination module.

Figure 6:
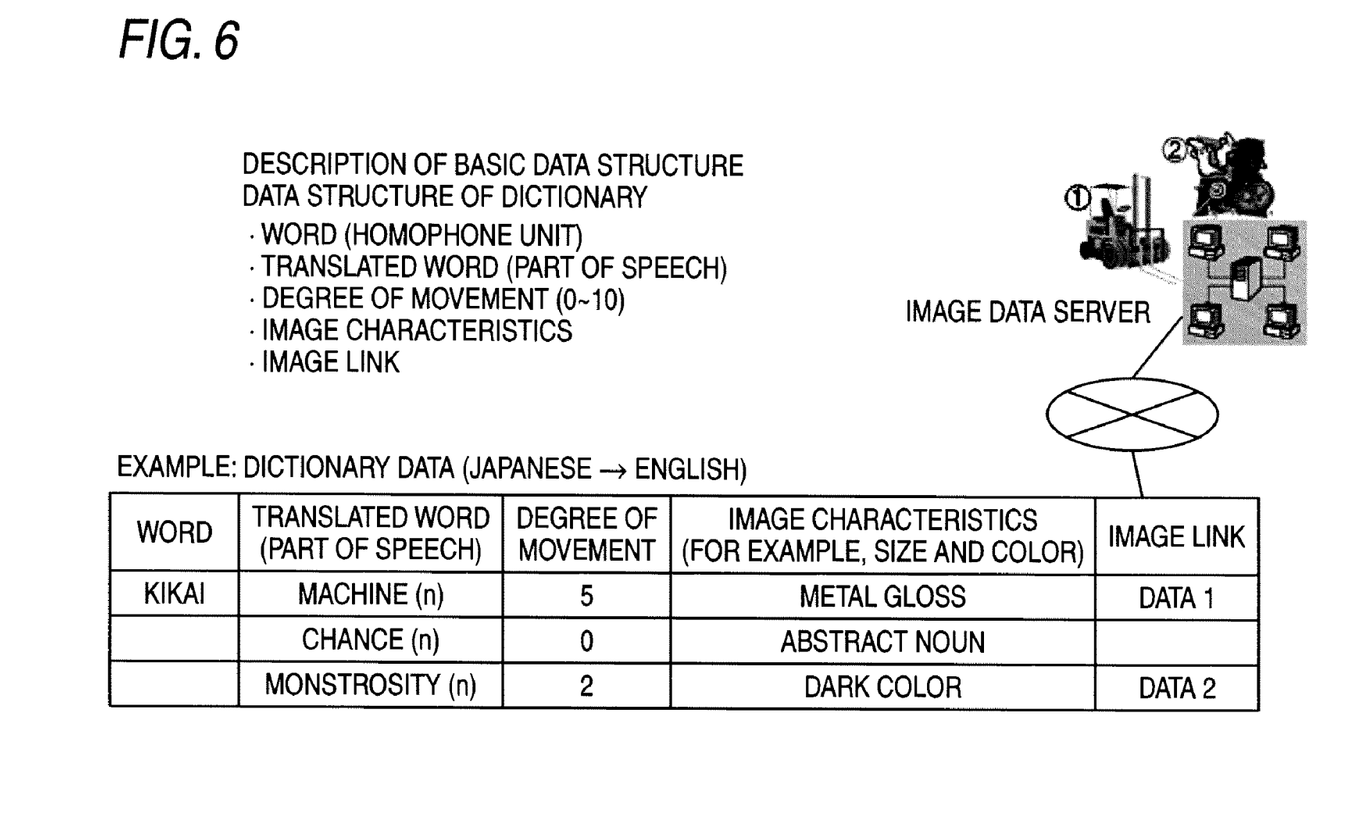
FIG. 6 is a diagram illustrating a basic data structure according to the embodiment.

FIG. 6 is a diagram illustrating a basic data structure according to the embodiment. The data structure of a dictionary includes a word (a homophone unit), a translated word (a part of speech), the degree of movement (0 to 10), image characteristics, and an image link.

For example, three nouns "machine (n)", "chance (n)", and "monstrosity (n)" are given as the translated words of a Japanese word "kikai", and values 5, 0, and 2 are allocated as the degrees of movement to the three nouns. In addition, a metal gloss, an abstract noun, and a dark color are allocated as the image characteristics to the three nouns, and image links (for example, address information) are established with two of the three nouns. For example, the links are connected to an image data server of a TV program provider.

Figure 7:
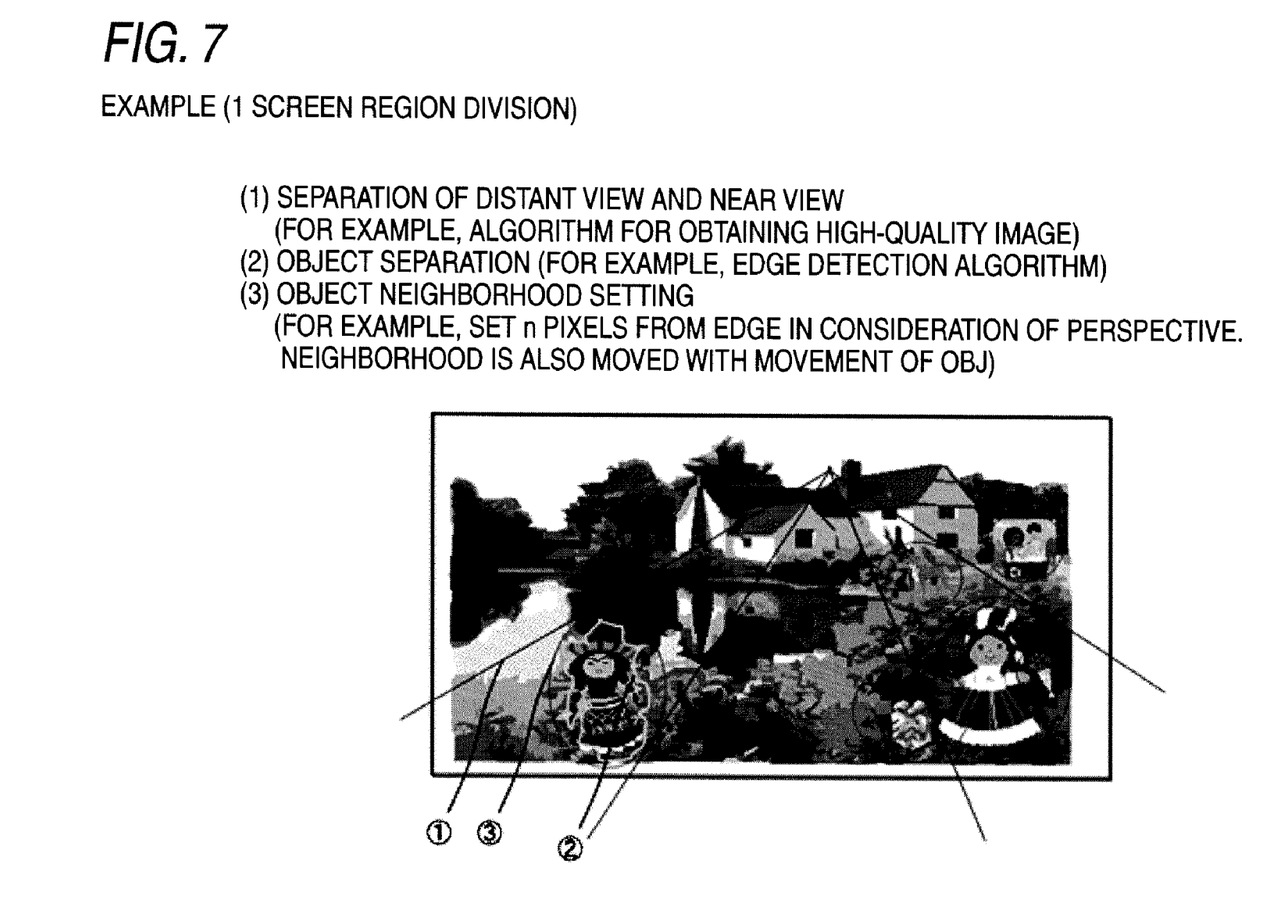
FIG. 7 is a diagram illustrating Example 1 (the separation of an image region) used in the embodiment.

FIG. 7 shows an example of a process of dividing an image region used in the embodiment. The process is performed through the following three stages:

(1) Separation of a distant view and a near view (for example, an algorithm for obtaining a high-quality image);

(2) Object separation (for example, an edge detection algorithm); and (3) Object neighborhood setting (for example, set n pixels from the edge in consideration of perspective. Neighborhood is also moved with the movement of the OBJ).

Figure 8:
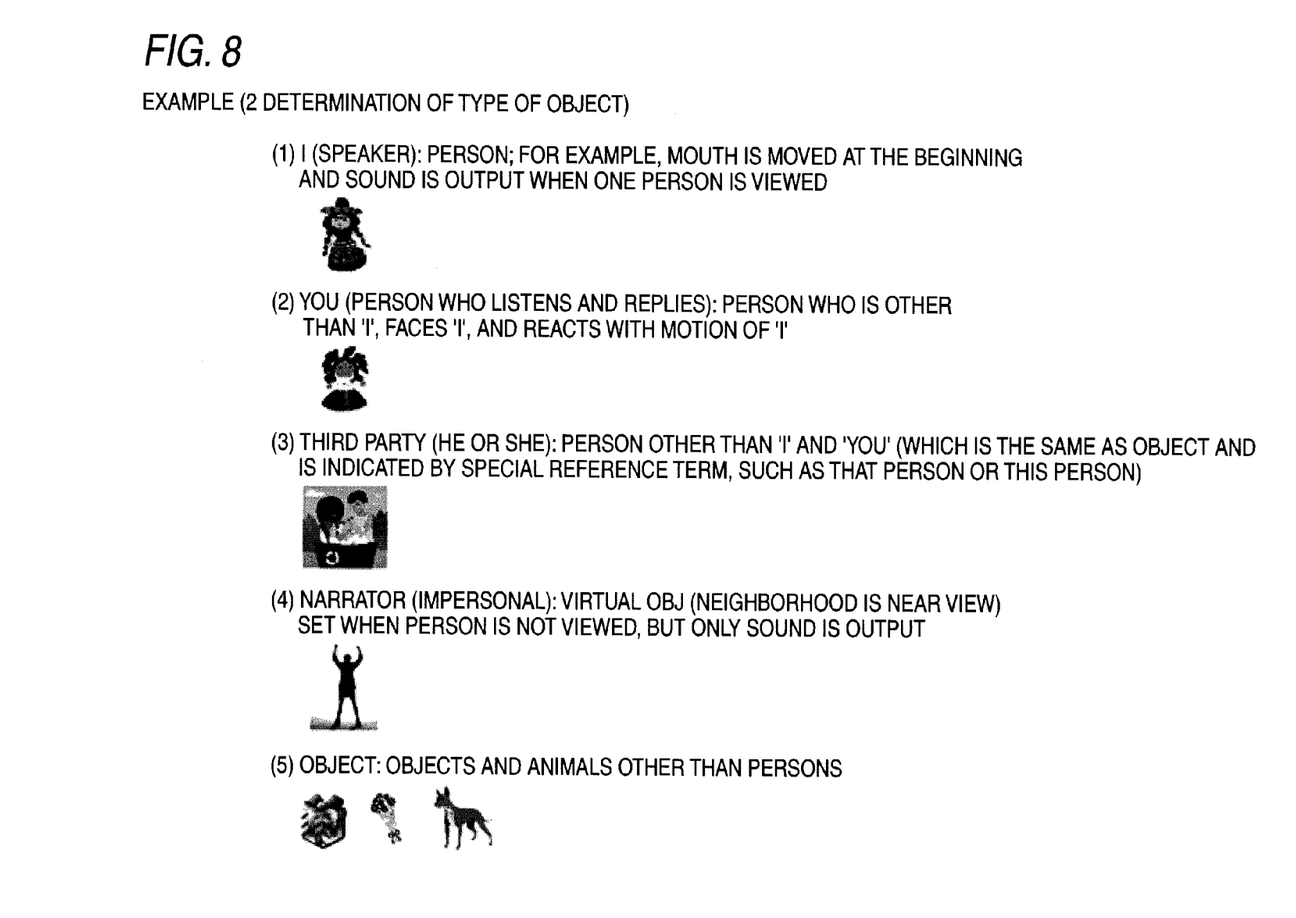
FIG. 8 is a diagram illustrating Example 2 (the determination of the type of object) used in the embodiment.

FIG. 8 is an example of a process of determining the type of object used in the embodiment. The following five types are considered:

(1) I (speaker): a person; for example, the mouth is moved at the beginning and a sound is output when one person is viewed;

(2) You (person who listens and replies): a person who is other than "I", faces "I", and reacts to the motion of "I";

(3) A third party (he or she): a person other than "I" and "you" (which is the same as an object and is indicated by a special reference term, such as that person or this person);

(4) A narrator (impersonal): a virtual OBJ (neighborhood is a near view) set when a person is not viewed, but only a sound is output.

A speaker recognition technique may be used to determine the same person. This is effective when a plurality of persons is not viewed at a given time; and (5) An object: objects and animals other than persons.

Figure 9:
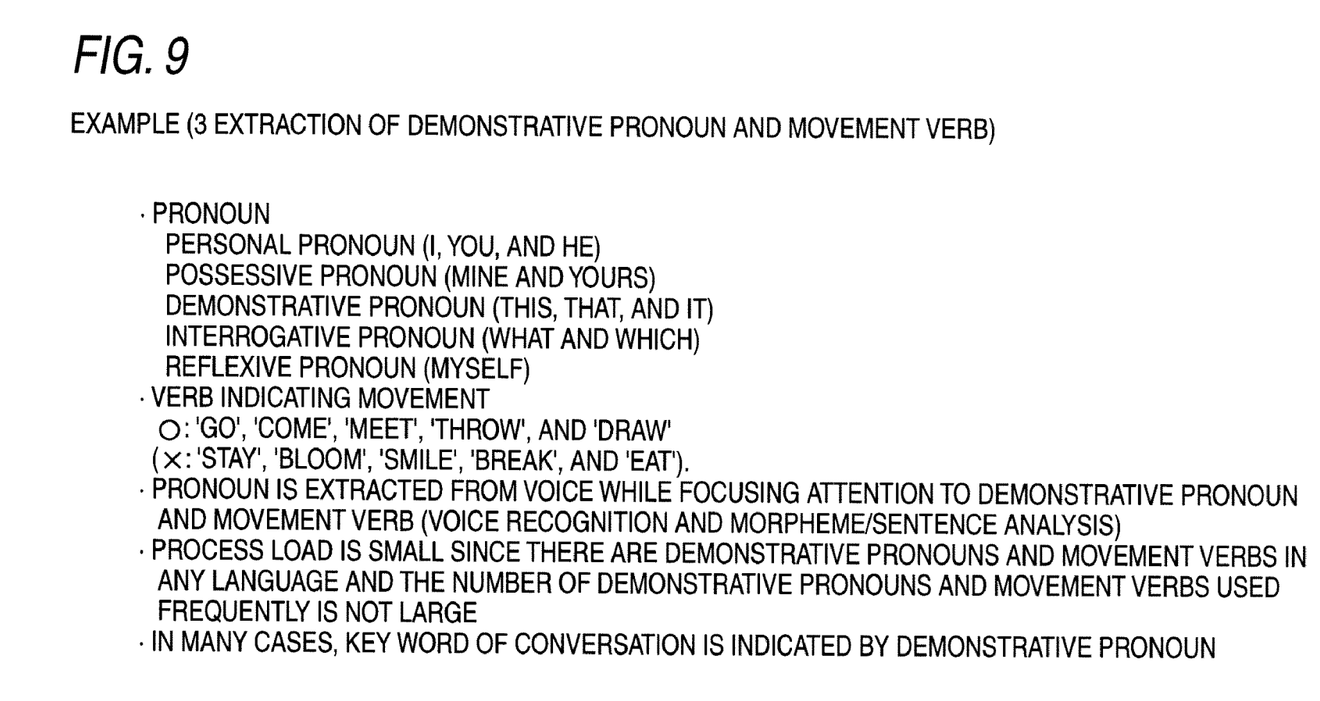
FIG. 9 is a diagram illustrating Example 3 (the extraction of a demonstrative pronoun and a movement verb) used in the embodiment.

FIG. 9 is a diagram illustrating an example of a process of extracting a demonstrative pronoun and a movement verb used in the embodiment.

First, the pronoun is divided into a personal pronoun (I, you, and he), a possessive pronoun (mine and yours), a demonstrative pronoun (this, that, and it), an interrogative pronoun (what and which), and a reflexive pronoun (myself). For example, examples of the verb include "go", "come", "meet", "throw", and "draw" (as counterexamples, "stay", "bloom", "smile", "break", and "eat").

The pronoun is extracted from a voice while focusing attention onto the demonstrative pronoun and the movement verb (for example, using voice recognition and a morpheme/sentence analysis technique).

Figure 10:
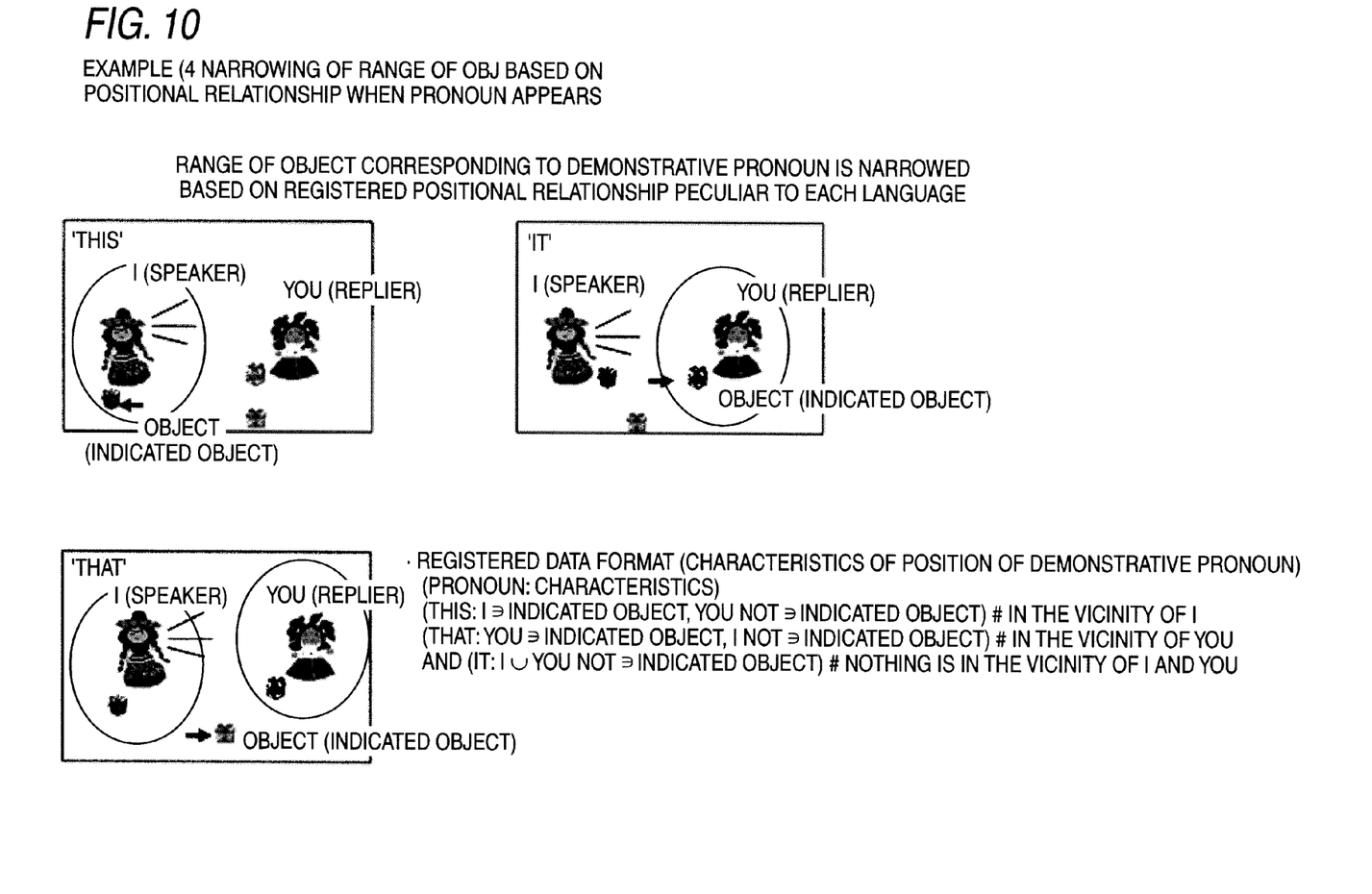
FIG. 10 is a diagram illustrating Example 4 (the narrowing of the range of OBJ based on a positional relationship when a pronoun appears) used in the embodiment.

FIG. 10 is an example of a process of narrowing the range of the object OBJ based on the positional relationship when the pronoun appears used in the embodiment. The range of an object OBJ corresponding to the demonstrative pronoun is narrowed based on the positional relationship peculiar to each language, which is registered in advance.

For example, as a registered data format (characteristics of the position of the demonstrative pronoun), there are following elements:

(pronoun: characteristics);

(this: I ∋ an indicated object, you NOT ∋ an indicated object) # in the vicinity of I;

(that: you ∋ an indicated object, I NOT ∋ an indicated object) # in the vicinity of you; and (it: I ∪ you NOT ∋ indicated object) # nothing is in the vicinity of I and you.

Figure 11:
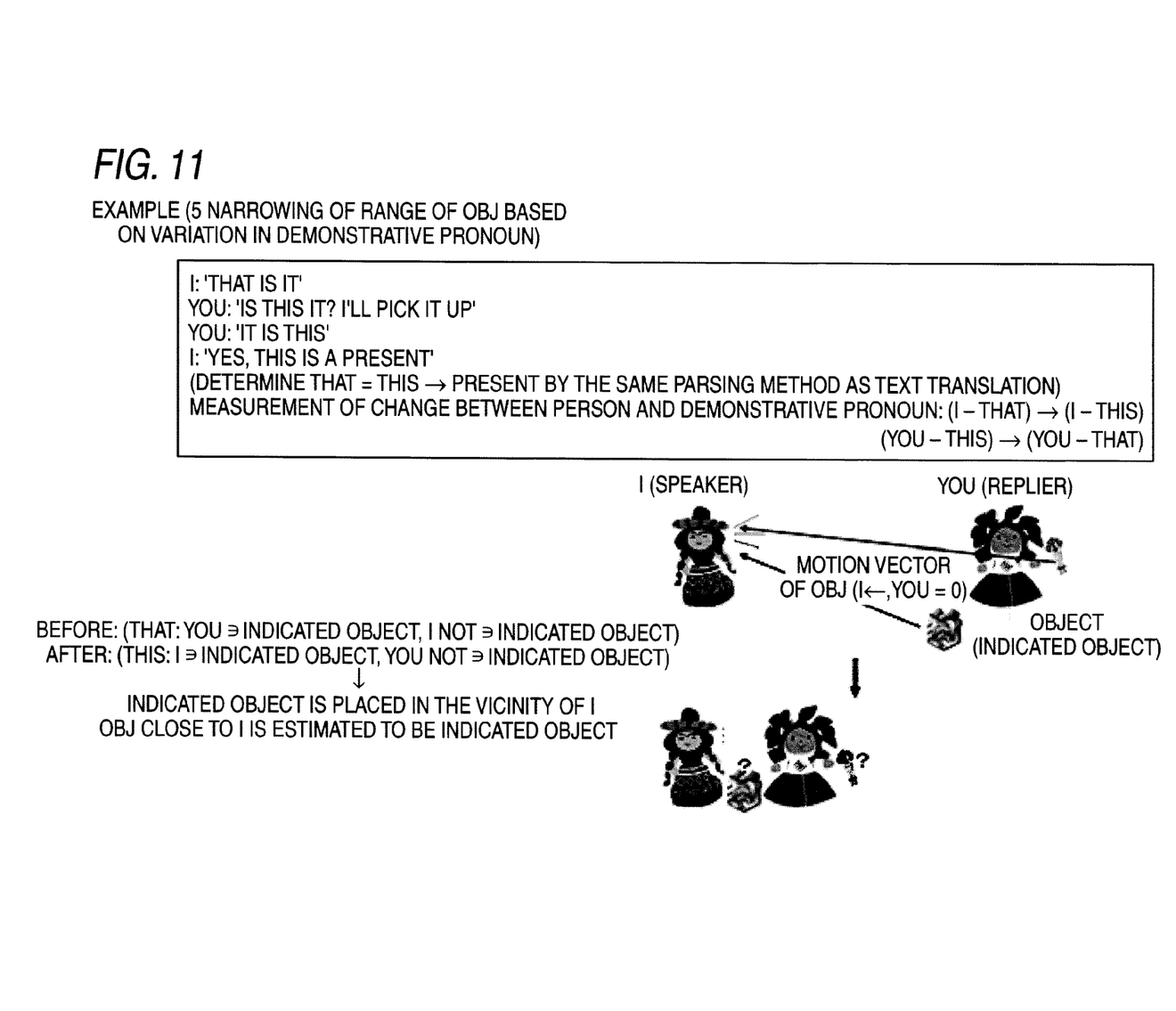
FIG. 11 is a diagram illustrating Example 5 (the narrowing of the range of OBJ based on a variation in a demonstrative pronoun) used in the embodiment.

FIG. 11 is an example of a process of the range of an object OBJ based on a variation in the demonstrative pronoun according to the embodiment.

It is assumed that the following conversation is made:

I: "That is it"

You: "Is this it? I'll pick it up"

You: "-;-; It is this"

I: "Yes, this is a present"

Based on the above-mentioned conversation, "present" is determined from "that", that is, "this" by the parsing method as text translation. In addition, a change in (person-demonstrative pronoun) (a change from "I-that" to "I-this" and a change from "you-this" to "you-that").

(that: I ∪ you NOT ∋ indicated object) is changed to (this: I ∋ an indicated object). In this way, the range of the object OBJ is narrowed in such a way that the object OBJ in the vicinity of I, that is, close to I is estimated as an indicated object.

Figure 12:
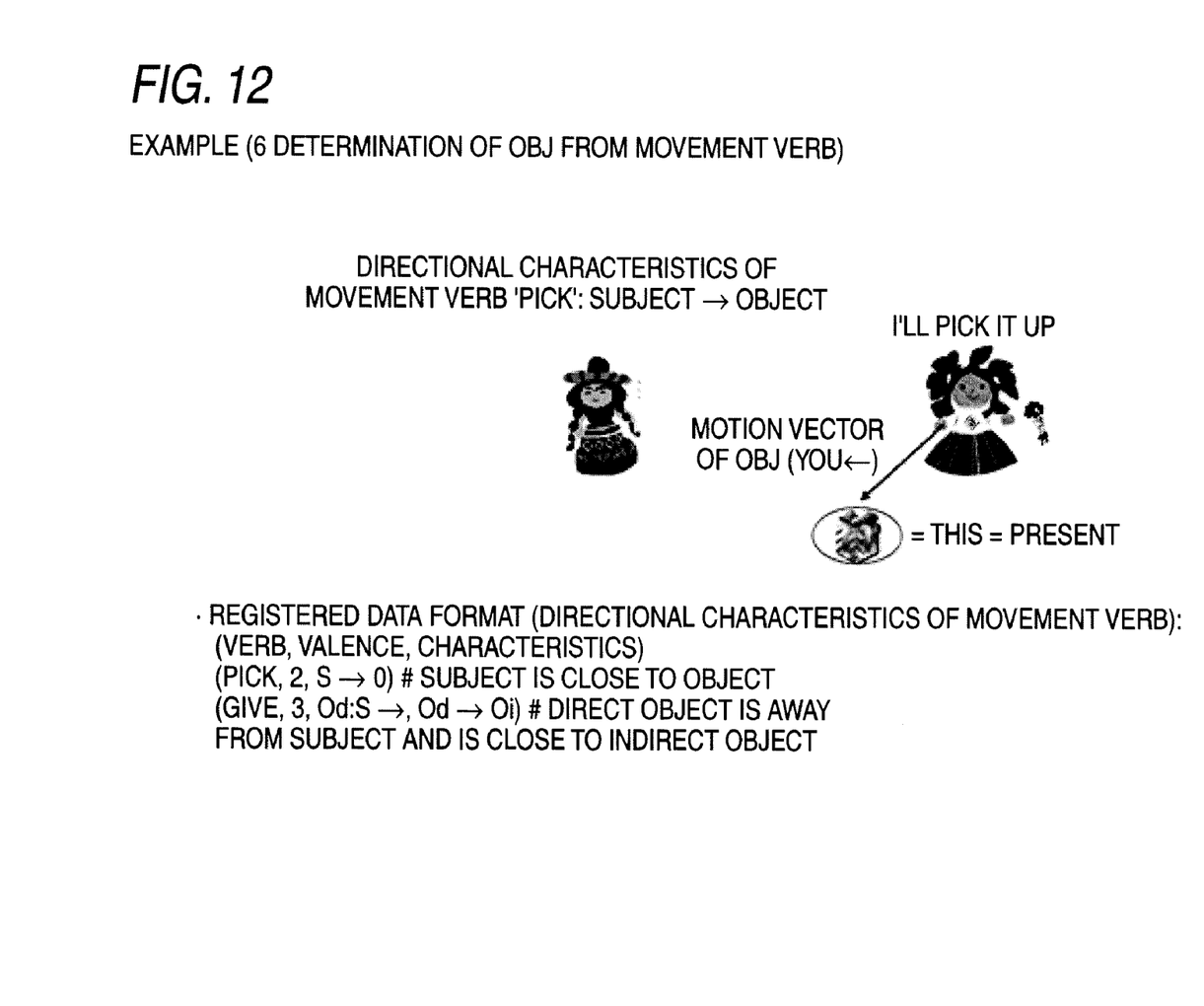
FIG. 12 is a diagram illustrating Example 6 (the determination of OBJ based on a movement verb) used in the embodiment.

FIG. 12 is a diagram illustrating an example of a process of determining the object OBJ from a movement verb used in the embodiment.

The directional characteristics (from the subject to the object) of the movement verb 'pick' are used.

As a registered data format (the directional characteristics of a movement verb), for example, there are the following elements:

(verb, valence, characteristics)
(pick, 2, S→0) # a subject is close to an object; and
(give, 3, Od:S→Od→Oi) # a direct object is away from a subject and is close to an indirect object.

Figure 13:
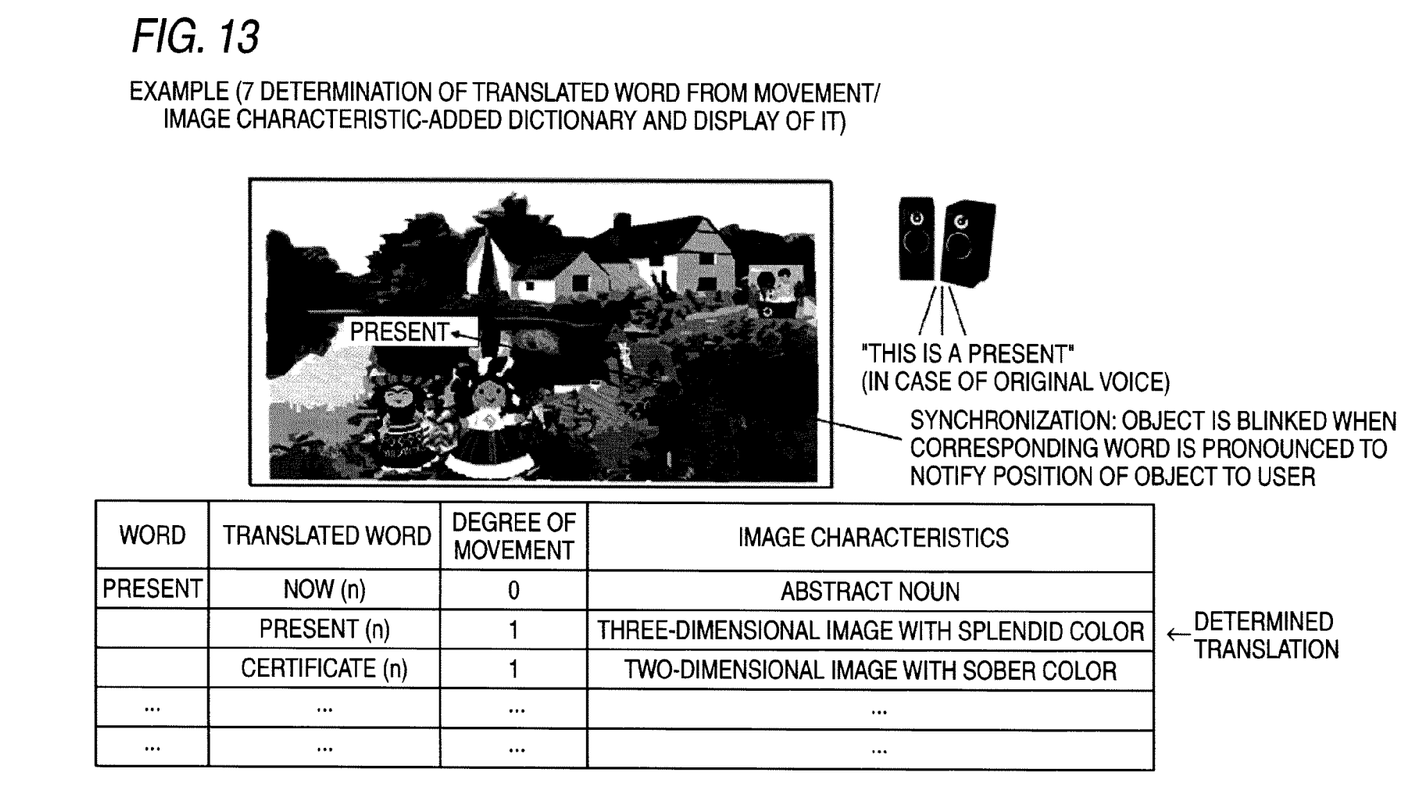
FIG. 13 is a diagram illustrating Example 7 (the determination of a translated word from a movement/image characteristic-added dictionary and the display of the translated word).

FIG. 13 is a diagram illustrating an example of a process of determining a translated word from the movement/image characteristic-added dictionary and displaying the translated word used in the embodiment.

As described above, the data structure of the dictionary includes a word (a homophone unit), a translated word (a part of speech), the degree of movement (0 to 10), image characteristics, and an image link.

For example, three Japanese words "gen-zai" (n), "okuri-mono" (n), and "shou-sho" (n) are given as examples of a translated word of the word "present", and values 0, 1, and 1 are allocated as the degree of movement to the three words. An abstract noun, a three-dimensional image with a splendid color, and a two-dimensional image with a sober color correspond to the image characteristics of the words. The determined translated word is "okuri-mono."

When "This is a present." is pronounced in the original language, as represented by an arrow in FIG. 13, an object corresponding to the present is blinked in synchronization with the output of a sound corresponding thereto to notify the position of the object to the user.

As a modification of the above-described embodiment, the following method may be used.

For example, the positional relationship between the words may be checked based on derivative words of demonstrative pronouns, such as "that way", "this way", "there", and "here".

The user may access a Web site and click a translated word of an object, thereby searching for the original word and the translated word.

A function of recording an image having the translation result added thereto may be provided.

A function of automatically determining the original voice may be provided.

All the translation results may be displayed as a caption.

Figure 14:
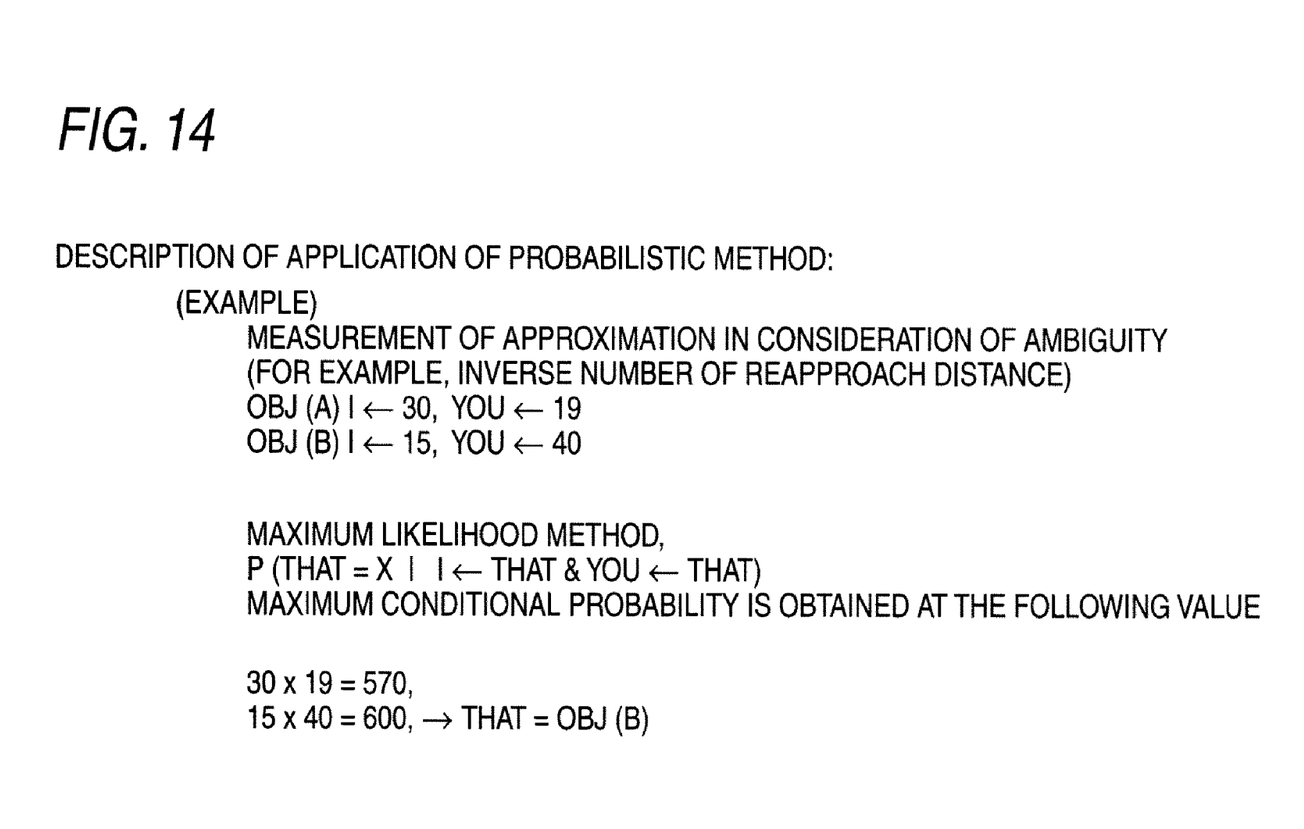
FIG. 14 is a diagram illustrating the application of a probabilistic method used in the embodiment.

When an object corresponding to a word is determined from a plurality of objects, a probabilistic estimation method, such as a maximum likelihood method, may be used (see FIG. 14).

FIG. 14 is a diagram illustrating the application of a probabilistic method used in the embodiment.

For example, the degree of approximation is measured in consideration of ambiguity. In an object OBJ(A), which is the word "present", an inverse value at the closest distance from "I" is 30 and an inverse value at the closest distance from "you" is 19. In another object OBJ(B), an inverse value at the closest distance from "I" is 15 and an inverse value at the closest distance from "you" is 40.

The maximum likelihood method relates to conditional probability. In this embodiment, a value before normalization to probability (0 to 1) is given as an example. As shown in FIG. 14, in the object OBJ(A), the value is 570, and in the object OBJ(B), the value is 600. Therefore, the object OBJ(B) with a larger value is selected as an object "that".

Second Embodiment

A second embodiment of the invention will be described with reference to FIGS. 1 to 14. In the second embodiment, a description of the same components as those in the first embodiment will be omitted.

The object type determining module 17 shown in FIG. 4 determines the type of object. A method of detecting an area in which there is a person as an area in which there is an interesting image will be described.

For example, the skin color of a face is extracted as the characteristics of a person. For example, the eye or the mouth may be extracted as the characteristics of the person as this technique has been put to practical use in digital cameras. In addition, the head or the body of the person is extracted as the characteristics, such as a color, a shape, a size, mutual arrangement, and motion.

An MT (Mahalanobis-Taguchi) system may be used as an algorithm for checking the person. The MT system is used as a framework for mounting, for example, an image recognizing unit. The MT system creates a reference space from a general vector data group in advance and determines whether input data belongs to the vector data group.

Here, the reference space is created from data including a person. For example, several tens or more of column vectors composed of k characteristic values of the person. Data is normalized for each of the k characteristic values using the average value of the k characteristic values and the standard deviation thereof.

In the MT system, an MT method, which is a popular method using an inverse matrix, is calculated by the following Expression (1) for a column vector Y, which is input data obtained by normalizing a Mahalanobis distance MD (square distance). That is, the MT method is a scalar value obtained by dividing the product of an inverse matrix $R^{-1}$ of a correlation matrix R, which is a reference space, and Y by the number k of vector items.

$$D^2 = \frac{1}{k} Y^T R^{-1} Y \qquad (1)$$

For example, a numerical table corresponding to the correlation matrix R and a program for the above-mentioned calculation may be provided in the apparatus in advance when the apparatus is manufactured.

Among techniques related to the MT system, an MTA method using a cofactor matrix, a TS method using Schmidt orthogonal expansion, or a multi-layer method thereof may be used other than the MT method. For example, when it has been known that the skin color of the face is generally used as the characteristics of the person, the TS method is used to preferentially calculate a dominant item among k items. In this way, it is possible to improve the accuracy of calculation. In addition, it is preferable to use a T method that has been currently used first.

It is determined whether an object is a person after extraction as follows. For example, an object having an MD of 1 or less is determined to be a person, and an object having an MD of 5 or more is determined not to be a person. An object having an MD in the range of 1 to 5 may be processed after a value, such as reliability, is given to the object according to the degree of likeness of a person.

A pixel block size in the reference space may be appropriately changed. In addition, it is preferable that the reference space be changed depending on the content of an interesting position and the type of target. The determination may be performed based on the highest value of a target among a plurality of MD results for one input. For example, when a person is used as a target, different methods are used. When a child with a form different from that of an adult is particularly discriminated, the reference space of the child is created. In addition, it is possible to easily create the reference space of an object other than the person, for example, a vehicle. As such, when there is an object whose reference space can be created with high accuracy, the number of objects, which are candidates of the person, may be reduced in advance.

In order to determine the type of reference space used, an interactive method may be used when the user uses a remote controller to set the menu of a display screen. The type of reference space to be used may be automatically determined in consideration of the preference of the user.

In this embodiment, the MT system that is generally used to determine a normal state is be used to most suitably correspond to a process target whose algorithm is not easily settled.

The use of the MT system makes it possible to increase the possibility that the accuracy of the process of determining the type of object used in the embodiment shown in FIG. 8 will be improved.

In the above-described embodiment, the motion estimated from the demonstrative pronoun or the movement verb that is extracted from a voice is compared with the motion of an object in a video, and the word in the voice and the object in the video are associated with each other. Then, the image characteristics of the object are compared with data, such as the image characteristics added to a translation dictionary, and a translated word of a corresponding word is determined based on the comparison result. Therefore, it is possible to improve translation accuracy, as compared to the translation method using only a voice or the text translation method according to the related art.

In addition, the correspondence between the object and the translated word is determined, the translated word is displayed close to the object, and the translated word is blinked in synchronization with a voice. Therefore, it is possible to improve the viewer's understanding of the content of information, as compared to the automatic translation method according to the related art that outputs only the translated words.

This embodiment may be used as a language learning apparatus by delaying the display of the translated words for a predetermined amount of time, which is also different from the automatic translation apparatus according to the related art.

This embodiment has the following effects. The motion information (a demonstrative pronoun and a movement verb) extracted from a voice corresponds to the motion vector of a video, and the information of the video is used for translation. Therefore, it is easy to determine the meaning of an ambiguous word and it is possible to improve the accuracy of automatic translation. In addition, it is possible to improve the utilization of information and it is possible to differentiate television translation from text data translation on the Web.

The translated word is displayed in the vicinity of a correspondence object so as to be blinked in synchronization with the pronunciation of the word. In this way, a translated word, an image, and a voice are integrated with each other, which makes it easy for the user to understand the meaning of foreign language information. This is particularly effective when the user directly accesses a foreign language video distributed through the Internet.

Full translation is output while being combined with a voice or the display of the translated words delayed for a predetermined amount of time. In this way, it is possible to obtain a language learning effect.

The points of the embodiment are as follows.

1. A demonstrative pronoun that is extracted from a voice is associated with an object that is cut out from a video according to the positional relationship of the demonstrative pronoun.

2. A variation in a demonstrative pronoun, the directionality of a 'movement verb', and the motion vector of an object are compared to determine the object indicated by the demonstrative pronoun.

3. A translation dictionary having the degree of movement of words, image characteristics, and image links as data, an Internet image search module, and an image characteristic comparison unit are provided, and the degree of movement of an object and image characteristics are compared to determine the meaning of a word corresponding to the object. In this way, the accuracy of translation is improved.

4. A word (original word), an object (image), and a translated word are integrally recognized in such a way that the translated word is displayed close to the object on the screen and is blinked in synchronization with the pronunciation of a correspondence word. In this way, it is possible to improve the recognition of the information of a voice/video.

5. A function of outputting a full translation with a synthesized voice instead of the original voice is provided.

6. A language learning function of delaying the display of a translated word from the pronunciation of the word by a predetermined amount of time is provided.

The present invention is not limited to the above-described embodiment, but various modifications and changes of the present invention can be made without departing from the scope and spirit of the present invention. For example, instead of receiving broadcast waves using the antenna and the tuner, programs may be received through the Internet.

Although the embodiment according to the present invention has been described above, the present invention is not limited to the above-mentioned embodiments but can be variously modified. Constituent components disclosed in the aforementioned embodiment may be combined suitably to form various modifications. For example, some of all constituent components disclosed in the embodiment may be removed, replaced, or may be appropriately combined with other components.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A television receiver comprising:
    an audio data processing module configured to extract a demonstrative word spoken by a first speaker and a second speaker from an input audio;
    an image data processing module configured to cut out objects from an input image; and
    a recognition module configured to recognize a target object from among the objects being cut out based on:
        a change of combination of the first speaker and the demonstrative word spoken by the first speaker, and a change of combination of the second speaker and the demonstrative word spoken by the second speaker, in a dialogue between the first speaker and the second speaker; and a change of positional relationships between the first speaker and the objects, and a change of positional relationships between the second speaker and the objects, in the input image.

2. The television receiver of claim 1, wherein the recognition module is configured to recognize the target object from among the objects being cut out based on a word spoken by the first speaker and the second speaker, the word being associated with a movement of at least one of the first speaker, the second speaker, and the target object, and in accordance with:

a positional relationship between an object that corresponds to a subject and an object that corresponds to an object, which are spoken by the first speaker, in the input image; or a change in position of the object in the input image presumed by a change of positional relationship between an object that corresponds to an object and an object that corresponds to an indirect object, which are spoken by the first speaker.

3. The television receiver of claim 2, wherein the recognition module is configured to recognize the target object from among the objects being cut out based on a word spoken by the first speaker and the second speaker, the word having a meaning of a movement of at least one of the first speaker, the second speaker, and the target object, and in accordance with:

the positional relationship between the object that corresponds to the subject and the object that corresponds to the object, which are spoken by the first speaker, in the input image; or the change in position of the object in the input image presumed by the change of positional relationship between the object that corresponds to the object in a context spoken by the first speaker and the object that corresponds to the indirect object in the context.

4. The television receiver of claim 1 further comprising:

a dictionary data storage module configured to store a set of:

a word;

a plurality of translated words, which are translations of the word in a plurality of languages; and a parameter that represents intensiveness of a movement and characteristics of appearance of each of the translated words, wherein the recognition module is configured to:

extract a parameter that represents intensiveness of a movement and characteristics of appearance of an object based on a positional variation in the input image of the object that is recognized as the target object;

compare the parameter that is extracted and the parameter that is stored in the dictionary data storage module; and determine a translated word of a word that corresponds to the object that is recognized as the target object.

5. The television receiver of claim 4 further comprising:

an image translated result composition module configured to:

extract a translated word that is translation of a word comprised in the input audio into other languages by referring to the dictionary data storage module; and display translated word that is extracted near an object that is recognized as the target object on the input image in synchronization with an output of an audio that correspond to the word.

6. The television receiver of claim 4, wherein the parameter stored in the dictionary data storage module represents semantic intensiveness of a movement and semantic characteristics of appearance of each of the translated words.

7. The television receiver of claim 1, wherein the image data processing module is configured to utilizes an MT system in cutting out the objects from the input image.

8. The television receiver of claim 1 further comprising:

a tuner configured to obtain the input image and the input audio from a broadcast wave.

9. A television receiving method comprising:

extracting a demonstrative word from an input audio;

cutting out objects from an input image; and recognizing a target object from among the objects being cut out based on:

a change of combination of a first speaker and the demonstrative word spoken by the first speaker, and a change of combination of a second speaker and the demonstrative word spoken by the second speaker, in a dialogue between the first speaker and the second speaker; and a change of positional relationships between the first speaker and the objects, and a change of positional relationships between the second speaker and the objects, in the input image.

* * * * *